United States Patent Office 3,251,693
Patented May 17, 1966

3,251,693
METHOD AND COMPOSITION FOR STABILIZING FERMENTED BEVERAGES
Mortimer Wilkes Brenner, Scarsdale, N.Y., assignor to Schwarz Laboratories, Inc., Mount Vernon, N.Y.
No Drawing. Filed May 10, 1963, Ser. No. 279,597
14 Claims. (Cl. 99—48)

This invention relates to the stabilization of beer, and particularly to compositions and processes for retention of clarity in packaged beer over a period of time.

The term "beer" as used herein includes all beers, ales and other fermented beverages wherein clarity of the packaged beverage must be maintained for the shelf life of the product and particularly when subjected to chilling.

In general, the brewing of beer begins with the preparation of an aqueous extract known as the wort which is prepared from malt and other cereal. The wort is then boiled with hops prior to the addition of yeast before the fermentation. After mashing of the malt and other cereals in the making of the wort, the wort may be filtered to remove the insoluble malt husks and other cereal particles initially present therein. The hot clear wort usually develops flocculent matters (hot trub) during boiling.

The extracts used in beer making comprise many substances in both true and colloidal solution that confer upon it a fundamental colloidal instability. Such colloids in the wort may be in a state of equilibrium prior to fermentation, but during fermentation biochemical rearrangements, such as the removal of sugars and nitrogenous matter by the yeast and the formation of alcohol, glycerol, lactic and other acids by the fermentation reactions, disturb the equilibrium established in the wort. The fermented beer will thus lack clarity to a certain degree. Brewery post-fermentation treatment of beer includes processes for maintaining the beer in a colloidally stable condition. Such processes are directed toward the prevention of haze or turbidity in the beer during its shelf life and upon cooling or chilling prior to consumption.

Prior art processes have included the use of fining agents, such as isinglass and gelatin, to precipitate and settle out the coarser suspensoid particles. Prolonged cold storage and one or more filtrations have been employed to enhance colloidal stability in the beer prior to packaging.

It has been found that aging the beer in cold brewing cellars will reduce the amount of haze preventive treatment required before packaging. Such aging periods, however, may run into months and are uneconomic in practice. Further it has been found that long storage of the beer may induce flavor changes in the final product which are unacceptable to the consuming public.

Prior art attempts to maintain the clarity of beer include the addition of clays of the montmorillonite family to remove discoloring compounds from the malt. The process of adding montmorillonite clays to the barley prior to malting is disclosed in U.S. Patent No. 2,898,270. An alkali silica gel has also been proposed for treating beer as disclosed in U.S. Patent No. 2,316,241.

Further prior art attempts at maintaining beer clarity are disclosed in U.S. Patent Nos. 2,433,411 and 3,066,026, wherein a montmorillonite clay in combination with an enzyme is used as a haze preventative. The use of silica gel or swelling clays such as those of the montmorillonite family have posed further problems, however, in that the foaming qualities and the taste of the beer may be adversely affected as pointed out in U.S. Patent No. 2,433,411.

Accordingly, it is an object of the present invention to provide methods for the maintenance of clarity in beer after packaging;

Another object of the invention is to provide methods of the above character wherein beer clarity is maintained over extended periods of time and after one or more chillings of the beer;

A further object of the invention is to provide methods of the above character wherein the beer is colloidally stabilized before packaging;

Another object of the invention is to provide compositions of matter for carrying out the above described method;

A further object of the invention is to provide compositions of matter for carrying out the above described methods wherein the flavor stability of the finished beer is enhanced and other properties, such as foam stability, are not injured;

A further object of the invention is to provide methods and compositions of matter of the above described character which are economical in use and practice;

Other objects of the invention will in part be obvious and will in part appear hereinafter.

The invention accordingly comprises the several steps and the relation of one or more of such steps with respect to each of the others, and the compositions which possess the characteristics, properties, and relation of constituents, all as exemplified in the detailed disclosure hereinafter set forth, and the scope of the invention will be indicated in the claims.

It has been found that during the period of shelf storage a number of changes can take place in packaged beer. These changes may influence the flavor, taste, color, appearance or other qualities of the beer, any of which may render the product less desirable. Climatic conditions, exposure to light, the presence of certain compounds such as catalysts all affect the stability of the beer.

The clarity of beer is a principal factor in consumer appeal since turbid or hazy beer appears to be less palatable. Beer haze can be generally classified in two categories, "chill haze" which appears when the beer is chilled below ambient temperature, and "permanent haze" which persists in the beer at room temperatures. It has been found that these hazes are primarily due to complexes of protein and tannin, through hydrogen bonding, and are promoted by the presence of metals and oxidation. The protein-tannin complex is governed by the law of mass action, i.e., the product of protein (P) and tannin (T) equals K, where K is a constant whose value depends on the temperature. Thus, the clarity of the beer at a given temperature depends upon its composition with respect to the P, T isotherm. By plotting P and T concentrations on an X and Y axis, respectively, it will be found that the isotherm for the protein tannin complex will generally follow a smooth curve for a given temperature. Thus, if the protein-tanning concentrations place the beer below the isotherm, the beer will remain clear. Upon chilling, however, the point for the protein-tannin concentration of the beer may be in a metastable or unstable area resulting in the development of haze.

I have found that certain silicates markedly improve the stability of packaged beer without the deleterious effects to foaming and taste that have been experienced in the prior art as pointed out above. The preferred silicates are calcium silicates and magnesium silicates wherein the amount of CaO or MgO plus $SiO_2$ accounts for at least 70 percent of the silicate by weight. Preferably these silicates are produced by hydrothermal reaction of diatomaceous silica with lime or magnesia. It has been found that the synthetic production of these silicates results in a particle size which may average from 0.5 to 20 microns. Many of these synthetic calcium-magnesium silicates are commercially produced and are less expensive in use than a number of the prior art compositions which have been used to stabilize beer.

Zinc silicates have also been found to be effective stabilizing adsorbents wherein the amount of ZnO plus $SiO_2$ accounts for at least 70 percent of the silicate by weight. The mineral willemite is a good source of zinc silicate and may be used in its natural form or it may be synthetically prepared as a hydrated zinc silicate which may have some of the impurities such as iron oxide removed.

The adsorbent silicates should have less than 2 percent $TiO_2$, 5 percent $Fe_2O_3$ and 5 percent $Al_2O_3$. These metal oxides are present in excessive amounts in a number of prior art clays. My silicates are all insoluble in water and are non-toxic. Further, a high proportion of CaO, MgO, or ZnO to $SiO_2$ is preferred. The CaO, MgO or ZnO should comprise at least 15 percent of the adsorbent by weight.

With the use of my silicates the foaming qualities and taste of the beer have been unaffected. This may be in part due to the low percentage of certain soluble heavy metal oxides present in the silicate as opposed to prior art clays of the montmorillonite family which have a substantially greater percentage of iron oxide, for example. It may be that the foam qualities, taste, and other qualities of the beer are affected by montmorillonite clays and the like because of the swelling of those compositions. The gels and swelling clays such as montmorillonites swell to produce a lattice-like structure which may permit ion exchange. It has been found that montmorillonites swell along their crystallographic C-axis when hydrated. It is therefore believed that these prior art clays and gels may not only adsorb proteins as reported in the prior art but also other molecules which affect the foaming qualities and taste of the beer.

The calcium, magnesium or zinc silicates may be added to the wort or beer at any stage prior to final filtration, e.g., during wort boiling, wort storage, fermentation, or during beer storage or aging. It is preferable, however, that the silicate be added to the beer prior to or during filtration. At this stage in the beer making process, the silicate is preferably added with filter aid and is filtered out with the filter aid, thus adding only the step of introducing the silicate to the beer.

The insoluble non-toxic silicates provide stability in the beer by the removal of anthocyanogens. The following table illustrates the removal of anthocyanogens from beer to which 100 and 1000 milligrams per liter have been added. The figures in the table below are in terms of reductions in optical densities at 550 mu wavelength used in the determination of anthocyanogens by the method of Harris and Ricketts (J. Inst. Brewing 65, 331–333 1959):

*Table I*

| Adsorbent | Milligrams of adsorbent per liter of beer | |
|---|---|---|
| | 100 | 1,000 |
| Calcium silicate: 53% $SiO_2$, 23% CaO | 9 | 54 |
| Calcium silicate: 54% $SiO_2$, 25% CaO | 9 | 119 |
| Magnesium silicate: 66% $SiO_2$, 17% MgO | 39 | 91 |

The clarity and stability of the beer are enhanced by the removal of anthocyanogens. I have found that the addition of 50 to 2000 milligrams of adsorbent per liter of beer will result in beer of improved clarity and stability. For most beers 100–1000 p.p.m. of adsorbent will be sufficient to achieve such improvement.

Beers differ widely in their haze development characteristics depending upon the type and quantity of malt, cereals and hops used, the mashing process, fermentation, and storage methods. In many instances it may be more desirable to reduce the amount of adsorbent used and to modify the protein which may enter a protein-tannin complex through the addition of protein modifying enzymes. These enzymes may be one or more plant proteases such as papain, ficin, bromelin, or crude preparations or extracts from fungal sources, such as *Aspergillus oryzae*, or from bacterial sources, such as *Bacillus subtilis*, or from animal sources, such as pepsin, trypsin and the like. In combination with these proteases, one or more amylases, pectinases, cellulases or hemicellulases may also be used, since it has been shown that starch, pectins, and cellulosic bodies may contribute to turbidity problems. The following examples illustrate the combined treatment of silicate adsorbent and enzyme and the affect on packaged beer clarity after storage at high and low temperatures.

*Table II*

HELM RADIOMETER TURBIDITY VALUES

| Treatment | Storage 5 days at 122° F. and 2 days at 32° F. | Storage 10 days at 122° F. and 4 days at 32° F. |
|---|---|---|
| Control | ¹ 300 | ¹ 300 |
| 40 p.p.m. of combination enzymes | 239 | ¹ 300 |
| 500 p.p.m. calcium silicate plus 35 p.p.m. of combination enzymes | 46 | 58 |
| 500 p.p.m. magnesium silicate plus 35 p.p.m. of combination enzymes | 52 | 75 |

¹ Over.

It has been found that, as shown in the above Table II, 10 to 100 p.p.m. of an enzyme or combination of enzymes will reduce the amount of adsorbing material required to achieve beer stability and clarity. Further, the protein modifying enzyme remains in the beer after packaging to aid in maintaining the protein-tannin isotherm at a desirable level. The combination enzyme employed in Table II above is a combination of plant proteases plus enzymes from *Aspergilus oryzae* and *Bacillus subtilis*. The enzymes used will differ greatly in effect depending upon their concentration. Thus 1 p.p.m. of a crystaline enzyme may have the same effect as 1000 p.p.m. of a dilute enzyme preparation.

The following examples further illustrate beer stabilization according to the invention:

EXAMPLE I

Prior to final filtration, 12 pounds of acid magnesium silicate (over 70 percent by weight of MgO and $SiO_2$) was added to 100 barrels of beer from primary (ruh) storage to provide about 500 p.p.m. of magnesium silicate in the beer. About 25 pounds of filter aid was added to the beer and was then filtered out along with the magnesium silicate adsorbent. As a control another portion of the same beer was filtered with a proportionate amount of filter aid but with no adsorbent added. The control and treated beers were analyzed for haze formation as follows:

FORMAZIN TURBIDITY READING

| | 6 days at 75° F. | 6 days at 75° F. 2 days at 32° F. | 6 days at 75° F. 5 days at 122° F. 2 days at 32° F. |
|---|---|---|---|
| Control beer | 29 | 86 | 380 |
| Magnesium silicate treated beer | 18 | 63 | 208 |

EXAMPLE II

The same procedure was employed as in Example I except that the magnesium silicate added was 250 p.p.m. and 50 p.p.m. of mixed enzymes was also added to the treated beer.

FORMAZIN TURBIDITY READING

|  | 6 days at 75° F. | 6 days at 75° F. 2 days at 32° F. | 6 days at 75° F. 5 days at 122° F. 2 days at 32° F. |
|---|---|---|---|
| Control beer | 29 | 86 | 380 |
| Magnesium silicate plus enzyme treated beer | 18 | 18 | 120 |

EXAMPLE III

To 100 barrels of beer 500 p.p.m. of synethetic hydrated calcium silicate (over 70 percent CaO plus $SiO_2$) was added in transfer from the fermentor to a primary storage vessel. A large portion of the calcium silicate settled out before filtration. A portion of the same beer was used as a control and the turbidity of each was analyzed after final filtration and packaging:

FORMAZIN TURBIDITY READING

|  | 6 days at 75° F. | 6 days at 75° F. 2 days at 32° F. | 6 days at 75° F. 5 days at 122° F. 2 days at 32° F. |
|---|---|---|---|
| Control beer | 29 | 86 | 380 |
| Calcium silicate treated beer | 18 | 25 | 170 |

EXAMPLE IV

The same procedure was followed as in Example III except that only 120 p.p.m. calcium silicate was added to the beer, and 25 p.p.m. mixed enzymes were added to the beer prior to packaging. The turbidity values were as follows:

FORMAZIN TURBIDITY READING

|  | 6 days at 75° F. | 6 days at 75° F. 2 days at 32° F. | 6 days at 75° F. 5 days at 122° F. 2 days at 32° F. |
|---|---|---|---|
| Control beer | 29 | 86 | 380 |
| Calcium silicate plus mixed enzymes | 19 | 24 | 76 |

In the above examples the clarity of the treated beer was found to be very good and the beer flavor excellent. The flavor of beers treated in accordance with the invention has been found to be better than that of the control samples in many instances.

It has also been found that addition of the adsorbent to the wort results in a stable beer. It is preferable to add 1000 p.p.m. into the line leaving the hop strainer. The adsorbent settles in the hot wort receiver and removes a substantial amount of tannin and tannin coacervate. The addition of enzyme will reduce the amount of adsorbent required as shown above. The enzyme should be added after wort boiling.

The use of my adsorbing material in combination with an enzyme or enzymes has a synergistic effect on stabilizing and maintaining the clarity of packaged beer. For certain beers, the addition of my adsorbing agent alone will be sufficient, but the addition of the adsorbing agent in combination with one or more enzymes will be more than additive as compared with using adsorbing agent or enzyme alone.

It will thus be seen that the objects set forth above, among those made apparent from the preceding description, are efficiently atained and, since certain changes may be made in carrying out the above process, and in the compositions set forth without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. The process of stabilizing and retaining the clarity and flavor of beer during packaged storage comprising the steps of
   A. adding a particulated non-swelling adsorbing agent to the beer
      (1) prior to final filtration,
      (2) said adsorbing agent being formed by hydrothermal reaction and containing at least 70 percent by weight taken from the group consisting of
         (a) calcium silicate,
         (b) magnesium silicate, and
         (c) zinc silicate.
   B. removing the adsorbing agent and then
   C. packaging the beer.

2. The process defined in claim 1 wherein said adsorbing agent is added in combination with a filter aid before the filtering step.

3. The process of stabilizing and retaining the clarity of beer during packaged storage comprising the steps of
   A. adding a particulated non-swelling adsorbing agent to the beer prior to final filtration,
      (1) said agent being formed by hydrothermal reaction and containing by weight at least 70 percent metal silicate containing
      (2) at least 15 percent of the adsorbing agent by weight taken from the group consisting of CaO, MgO and ZnO
      (3) and adding to the beer at least one protein modifying enzyme
   B. removing the adsorbing agent from the beer and then
   C. packaging the beer.

4. The process of stabilizing and retaining the clarity of beer during packaged storage comprising the steps of
   A. adding a particulated, non-swelling, non-toxic hydrothermally formed metal silicate to the beer,
   B. adding protein modifying enzymes to the beer
      (1) after wort boiling and prior to final filtration,
      (2) said enzymes being taken from the group consisting of proteases, pectinases, amylases, hemicellulases and cellulases,
   C. removing the silicate from the beer and then
   D. packaging the beer.

5. The process defined in claim 4 wherein the amount of enzyme added is 1 to 1000 p.p.m. of the wort or beer.

6. The process defined in claim 4 with the added step of adding a filter aid to the beer with the addition of the metal silicate.

7. The process defined in claim 6 wherein the amount of metal silicate added is 50 to 2000 p.p.m. of the beer.

8. The process of stabilizing and retaining the clarity of beer during package storage comprising the steps of
   A. adding to the beer 50 to 2000 p.p.m. of a particulated non-swelling hydrothermally formed silicate
      (1) containing at least 70 percent by weight taken from the group consisting of
         (a) calcium silicate,
         (b) magnesium silicate, and
         (c) zinc silicate
      (2) said silicate being formed by the hydrothermal reaction of $SiO_2$ with an oxide taken from the group consisting of
         a. CaO,
         b. MgO, and
         c. ZnO,
   B. filtering out said silicate and then
   C. packaging the beer.

9. The process defined in claim 8 wherein at least one enzyme is added to the beer before packaging taken from group consisting of proteases, pectinases, amylases, hemicellulases and cellulases.

10. The process defined in claim 9 wherein the amount of enzyme added is 1 to 1000 p.p.m.

11. The process of stabilizing and retaining the clarity of beer during packaged storage comprising the steps of
  A. adding a particulated, non-swelling adsorbing agent to the beer
    (1) prior to final filtration,
    (2) said adsorbing agent containing at least 70 percent by weight taken from the group consisting of
      (a) calcium silicate,
      (b) magnesium silicate, and
      (c) zinc silicate,
    (3) said silicates being formed by hydrothermal reaction,
  B. adding at least one protein modifying enzyme to the beer
    (1) after wort boiling
    (2) and before packaging,
    (3) said enzymes being taken from the group consisting of
      (a) plant, fungal, bacterial and animal proteases and amylases, fungal pectinases, hemicellulases and cellulases,
  C. filtering the beer, and
  D. packaging the beer.

12. The process defined in claim 11 wherein the amount of adsorbing agent is from 50 to 2000 p.p.m. and the amount of enzyme is 1 to 1000 p.p.m. of the beer to which they are added.

13. A composition of matter for the stabilization of beer, comprising,
  A. a non-swelling, particulated, synthetic silicate,
    (1) said synthetic silicate being hydrothermally formed,
    (2) having an average particle size of less than 20 microns,
  B. said silicate comprising at least 70% by weight taken from the group consisting of
    (1) calcium silicate,
    (2) magnesium silicate, and
    (3) zinc silicate,
  C. the remainder of the material being principally water of hydration and containing less than
    (1) 2% $TiO_2$,
    (2) 5% $Fe_2O_3$, and
    (3) 5% $Al_2O_3$
  by weight.

14. A composition of matter for the stabilization of beer, comprising,
  A. a non-swelling, particulated silicate formed by hydrothermal reaction and
  B. containing at least 15% by weight taken from the group consisting of
    (1) CaO,
    (2) MgO, and
    (3) ZnO,
  C. said composition containing less than
    (1) 2% $TiO_2$,
    (2) 5% $Fe_2O_3$, and
    (3) 5% $Al_2O_3$,
  D. the remainder of the composition being principally $SiO_2$ and water.

References Cited by the Examiner

UNITED STATES PATENTS

| | | | |
|---|---|---|---|
| 2,077,447 | 4/1937 | Wallerstein | 99—48 |
| 2,291,624 | 8/1942 | Heimann et al. | 99—48 |
| 2,416,007 | 2/1947 | Joachim | 99—48 |
| 2,878,125 | 3/1959 | Brenner | 99—48 |

A. LOUIS MONACELL, *Primary Examiner.*

D. M. STEPHENS, *Assistant Examiner.*